United States Patent [19]
Walker

[11] Patent Number: 6,134,586
[45] Date of Patent: Oct. 17, 2000

[54] STRIPING DATA ACROSS DISK ZONES

[75] Inventor: Mark L. Walker, Layton, Utah

[73] Assignee: Philips Electronics N.A. Corp., New York, N.Y.

[21] Appl. No.: 09/127,333

[22] Filed: Jul. 31, 1998

[51] Int. Cl.$^7$ .............................. H04N 7/14; H04N 7/173
[52] U.S. Cl. ................................ 709/219; 348/7; 348/12; 348/718; 455/5.1
[58] Field of Search .................................... 709/217–219; 348/7, 12, 13, 714, 715, 718, 719; 455/4.2, 5.1

[56] References Cited

U.S. PATENT DOCUMENTS

| | | | |
|---|---|---|---|
| 5,732,239 | 3/1998 | Tobagi et al. | 395/441 |
| 5,774,714 | 6/1998 | Thapar et al. | 395/611 |
| 5,852,705 | 12/1998 | Hanko et al. | 386/92 |

FOREIGN PATENT DOCUMENTS

0744868A2  11/1996  European Pat. Off. ....... H04N 7/173

OTHER PUBLICATIONS

Database WPI Section EI, Week 9814 Derwent Publications LTD., GB; Class T04, AN 98–158317 XP002124532 & TW 321 765 A (Ind Technology Inst), Dec. 1, 1997, Abstract & US 5 926 649 A 20 Jul. 1999) Column 7, Line 40–Column 11, Line 55.

By Tong S. R. et al.: Study On Disk For Video Servers, Multimedia Computing And Systems 1998, Jun. 28, 1998—pp. 86–95.

By Cohen A. et al.: "Pipelined Disk Arrays For Digital Movie Retrieval" Proceedings Of The International Conference On Multimedia Computing And Systems, US, Los Alamitos, IEEE Comp. Soc. Press, pp. 312–317.

Primary Examiner—John W. Miller
Attorney, Agent, or Firm—Michael E. Belk

[57] ABSTRACT

A video server with a file storage system for a disk drive in which the disk is logically divided into radial zones and sequential portions of files are stored in different zones according to a predetermined order of zones so as to reduce the average seek time during interleaved access to multiple files. When two files are stored with sequential portions of a first file located sequentially around the inside radius of the R/W surface and sequential clusters of a second file located sequentially around the outside radius of the R/W surface and the clusters of the files are read interleaved (taking turns) then the average seek time for reading the files is approximately equal to the maximum seek time. When the sequential clusters of the files are intentionally dispersed in a pattern in the zones, then the average seek time for reading the files is approximately ½ the maximum seek time.

2 Claims, 3 Drawing Sheets

STRIPING DATA ACROSS DISK ZONES

FIELD OF THE INVENTION

The inventions herein relate to storing information on random access storage in a multi-tasking environment, and are most closely related to the art of storing and retrieving information on disk drives of a multimedia or video data server.

A multimedia data server is a computer system which provides streams of multimedia data and in which audio and video portions of programs are stored in files on random access storage systems. A multimedia data stream is time critical because if a receiver such as a monitor does not receive the data within the required period of time then the multimedia program is not correctly displayed. Thus, the server has to continually provide the data stream.

BACKGROUND OF THE INVENTION

Currently large volumes of random access storage is usually provided in a video server by hard disk drives. Each hard drive includes one or more disks (typically 5 disks often called platters) mounted on a common axle driven to spin by a motor. Each platter (disk) may include thousands of circular tracks in which data can be stored. The tracks are provided in a storage area that extends from an inner circular edge at about ¼ of the radius of the platter to the outer circular edge of the platter. A respective read/write head for each side of each platter, is mounted on one of the branches of a common comb-shaped carrier called a comb. The comb is turned by another motor called an actuator so as to move the heads radially with respect to the platters or disks in order to position the heads above one of a multitude of tracks on the platter to access (read or write) information from the selected track. When the heads are in position to access information on a track then each of the heads on the comb is in position to access a respective track on a respective side of a disk without further substantial movement of the comb. All the tracks on respective sides of the disks, which can be accessed, when the comb is positioned for accessing tracks without further significant movement of the comb, are referred to as a cylinder.

Moving the comb from a position to access one cylinder to a position to access another cylinder is known in the art as seeking, and the time required for such movement is known as seek time. The radial distance that the head moves during seeking is the seek distance. The seek time for moving to the adjacent cylinder is much shorter than the seek time for moving from a cylinder at the inner or outer edge to a cylinder at the other circular edge of the disk. In the seeking, first there is an acceleration period, then a constant velocity movement period, then a deceleration period, and finally a settling period, but for a seek across dozens of tracks, generally the seek time will be approximately equal to the seek distance.

After the head is positioned on the appropriate cylinder, then the system must wait until the disk rotates to the correct circumferential position to read the required data from the track. This rotational delay is known as latency. Where only a small section of a track needs to be read the average latency is about half the time for the disk to rotate. If the entire track needs to be read, then reading can begin anywhere, the data stored in a buffer, and the data is extracted from the buffer in the correct order. In such case the latency is zero.

In order to minimize seek time (and seek distance) for accessing a file, the information for a relatively short file is kept in one cylinder. Each cylinder may hold thousands of segments (256 or 512 bytes) so small files can fit in a single cylinder. If storage of a file requires multiple cylinders, the cylinders for the file are provided adjacently together. This speeds up access for sequentially accessed files such as programs and documents as well as randomly accessed files such as data base files that tend to have sections which are repeatedly accessed (retrieve, modify, store). In order to reduce latency time, the drive spins as quickly as technology allows. The disk spins around faster than information for the entire track can be accessed so usually each time the disk rotates only some of the sectors of the track are accessed (e.g. every second or third sector). Thus, the disk has to spin around several times before all the information for a track is accessed (read or written).

Optical disk drives typically have a single disk in position for access and the disks have a single spiral track, but rewritable optical disks can be used in a similar manner as hard drives to provide large quantities of random access storage with each loop of the spiral track used in the same manner as a cylinder of a hard drive. These optical systems have not yet become popular for multi-disk arrays, but could be adapted for that use.

In some modern high performance operating systems (e.g. IBM's OS/2) portions of a files are moved around when other files are deleted so files can always be kept together. In other systems such as Windows 95 or DOS by Microsoft, when files are deleted, then the available space is reused and files are written wherever space is available on the drive. These systems include utility programs (e.g. scan-disk) to allow the user to occasionally defragment the hard drives so that all the parts of a file are moved together on the same or adjacent cylinders.

Generally in current video servers, multiple multimedia programs are stored in a redundant array of inexpensive disks (RAID) type storage system. In a RAID level 3 hard drive system, one of the hard drives is designated as a parity drive. During storage, a respective portion of a file is stored in each of the other hard drives in a round robin manner, and then a parity portion is calculated and stored in the parity or redundant drive. Round robin is a method of taking turns during repeated access cycles in which each unit gets one turn in each turn cycle, and the units take turns in the same order during each turn cycle. Storing consecutive portions of the same file in multiple drives in a round robin manner is known in the art as striping. If any one drive in the RAID system fails during a read, then all the information will automatically be available by processing the information from the remaining drives. Note that in RAID level 5 the parity portion is stored in different hard drives.

The files for each multimedia program include at least one video file, at least one audio file, and multiple control files. The video files for a 1-hour program even in a highly compressed format, still requires several gigabytes of storage. The files for a program are kept together on the disk since portions of the files need to be accessed together. Typically many cylinders are required for each video program.

Typical multimedia data servers are able to simultaneously provide multiple program streams. That is, the streams of several programs may be input and/or output simultaneously. This requires simultaneous disk access to multiple files. Simultaneous disk access means that, with regard to the streams, portions of the required files are retrieved as they are needed to provide data for the simultaneous streams. In this scheme several files are repeatedly accessed over short periods of time. The comb moves at high speeds back and fourth between the tracks for the required files as short portions of each file are sequentially accessed. That is the disk access is not really physically simultaneous with regard to the disks, but rather only pseudo-simultaneous, but functionally with respect to the data streams the access is simultaneous.

Those skilled in the art are directed to patent application Ser. No. 08/612,157 filed Mar. 7, 1996 and to patent application PCT/US96/17156 publication number WO 97/16023 published May 1, 1997.

The above citations are hereby incorporated herein in whole by reference.

SUMMARY OF THE INVENTION

The inventor recognized that in some cases, the files that have to be simultaneously accessed may be on opposite radial edges of the information storage area of the disks. In that case, the average seek distance for alternately accessing portions of the two files may approach the maximum seek distance, and the average seek time approaches the maximum seek time. The inventor has discovered that by logically dividing up the storage area of the disk into multiple ring-shaped zones (at least 3 and preferably 4 or more zones) and striping the information for each file across all these zones in a round robin manner, then the maximum average seek time and seek distance, for simultaneous access of any combination of files, can be reduced. Generally for a sufficient number of zones, the maximum average seek time or distance can be reduced to about half the maximum seek time or distance.

Other alternatives and advantages of applicant's inventions will be disclosed or become obvious to those skilled in the art by studying the detailed description below with reference to the following drawings which illustrate the elements of the appended claims.

DETAILED DESCRIPTION INCLUDING SPECIFIC EMBODIMENTS AND THE BEST MODE

Figure 1:
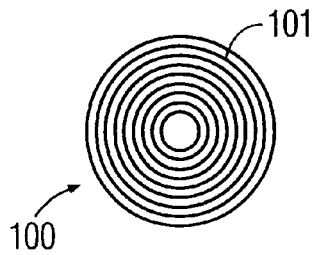
FIG. 1 schematically shows a disk with multiple tracks.

In FIG. 1, a disk 100 includes tracks 101 in which information is stored. A typical hard disk may have thousands of tracks, but only a few are shown for illustrative purposes. For optical disks there is usually only a single spiral track and for magnetic hard drives the tracks are usually circular as shown. The read/write head of a disk drive must move radially with respect to the disk in order to switch between the circular tracks (or loops of a spiral track).

Figure 2:
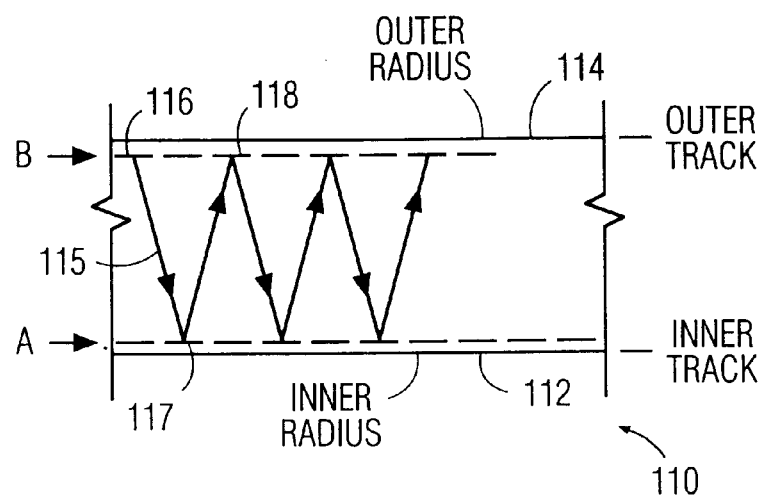
FIG. 2 schematically illustrates the storage area of a disk with two files being accessed on opposite edges of the storage area.

FIG. 2 schematically illustrates the storage area 110 of a disk drive as a rectangular area extending between the inside radius and outside radius of the storage area. In the illustration, sections of a first file A are near the inner track 112 and sections of a second file B are near the outer track 114.

Path 115 indicates the order that sections of the files are accessed (read or written). The path is not the actual path of the head and the illustration does not address disk latency. First section 116 of file B is accessed, then section 117 of file A is accessed, then section 118 of file B is accessed, and so forth.

As shown, the average seek time (and average seek distance) in this case is approximately equal to the maximum seek time (and maximum seek distance), because every seek crosses approximately the entire radial width of the storage area of the disk. Currently, for high performance disk systems the seek time for crossing half the tracks is around 9 ms, the maximum seek time is slightly less than twice as long, and for a disk rotating at 10,800 rpm the average latency is 2.8 ms. If the number of files being simultaneously accessed is increased it would still be possible that the files are at edges of the disk so that the average seek time would be approximately equal to the maximum seek time.

Notice that these files are being accessed sequentially, but the disk drive heads are moving similar to heads that are accessing random access data because multiple files are being accessed during the same short time period. Since the seek time limits the amount of information that can be extracted from files accessed in this manner, it is important to reduce the seek time.

Figure 3:
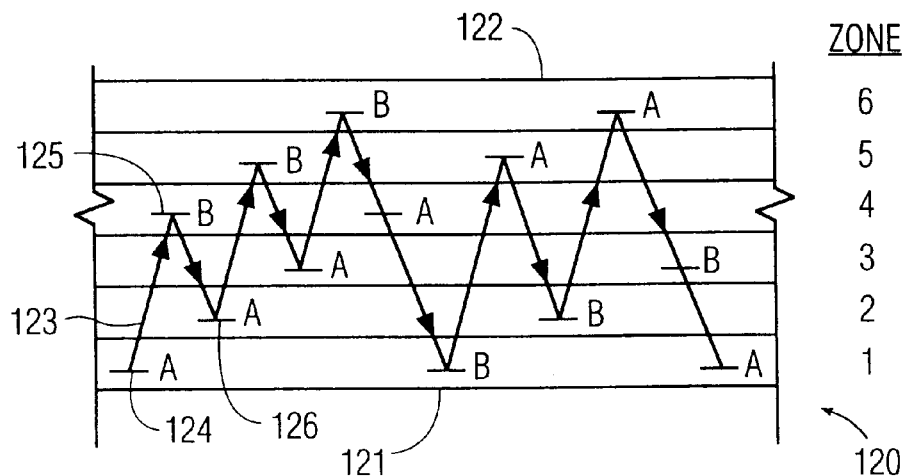
FIG. 3 schematically illustrates the storage area of a disk with the storage area divided into zones and two files striped across all the zones in a round robin manner in accordance with the invention.

FIG. 3 shows schematically the storage area 120 of a disk drive as a rectangular area extending between the inside edge 121 and outside edge 122 of the storage area. The figure illustrates an example of the access pattern of the invention in which sequential sections of files A and B are distributed into 6 zones in a round robin manner. Again, path 123 indicates the order in which the sections of files A and B are accessed. First, section 124 of file A is accessed, than section 125 of file B is accessed, then section 126 of file A is accessed, and so forth.

It can be shown, that the maximum average seek time when sections are distributed round robin into a sufficient number of zones, is approximately half the maximum average seek time when the sections are distributed randomly or when the sections of the files are kept together. The more zones that are provided, the more closely the maximum average approaches half the maximum seek time.

The predetermined order for accessing zones in the example of FIG. 3 is 1,2,3,4,5,6. At the beginning of the time shown, a section of file A in zone 1 is being accessed and a section of file B is about to be accessed in zone 4. Any order for accessing the zones can be implemented just as easily such as 1,3,5,6,4,2. However, all the files stored on the same drive should be stored 10 in the same order so as to guarantee, that the maximum average seek distance is about half the seek distance.

Figure 4:
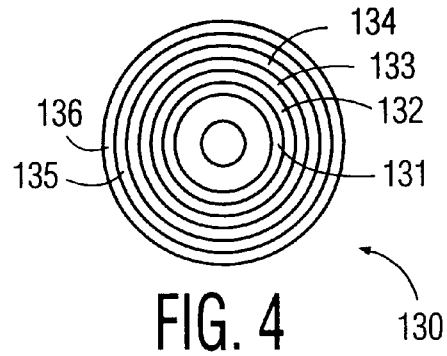
FIG. 4 illustrates the zones of the invention in which the storage area of the disk is divided.

FIG. 4 shows a disk divided into six zones numbered 131–136. Preferably, each zone is approximately the same size, and the zones apply to all the disks in a drive, so that, the zones become macro cylinders. For maximum efficiency, each section of. the file occupies an entire cylinder, and if the cylinders are different size, then each section occupies at least approximately the storage of the smallest cylinder. Preferably, each zone has approximately the same storage potential, and the multimedia files are approximately equally spread across all the storage drives of the RAID storage system, and also approximately equally spread across all the zones of each disk of each drive.

In one possible method of access in a RAID system, files are accessed in a macro cycle of multiple turn cycles. In a first turn cycle, one of the sequential sections of a file is accessed in one zone of each drive in turn, and then in the subsequent turn cycle, one of the sections of the file are accessed in one different zone of each drive in turn, and so on, until one section of the file has been accessed in each zone of each drive one time. This macro cycle is repeated until the entire file has been accessed.

In an alternative example, one of the sequential sections of a file is accessed in each zone of the drive, then in a similar manner the other drives of the system-are each accessed, and this macro cycle is repeated until the entire file has been accessed.

Figure 5:
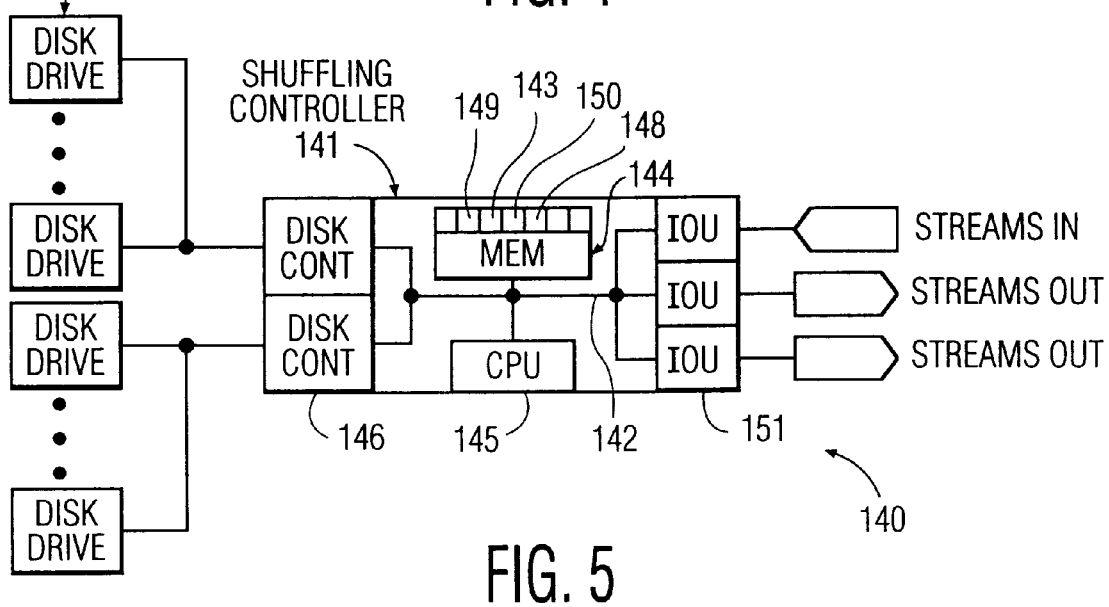
FIG. 5 illustrates an example video server with a shuffling controller for implementing the invention.

FIG. 5 illustrates a video server 140 with a shuffling controller 141 which stripes files across the multiple zones of the disk drives. The controller includes a system bus 142 through which other components of the server communicate. The system supports recording and/or playing a small number of simultaneous multimedia streams. Software module 143 in system memory 144 directs CPU 145 to command the disk controllers 146 to write sections of files onto hard drives 147. Software module 143 also directs the CPU to move the information from buffer 148 in the system memory, into the disk controllers, through the system bus. Similarly, software module 149 in the system memory directs the CPU to command the disk controllers to read sections of files from hard drives 147. Also, software module 149 directs the CPU to move the information from the disk controllers into buffer 148 in the system memory, through the system bus. Another software module 150 directs the CPU to command the input and output units 151 (IOUs) to record and/or to play a small number of simultaneous multimedia data streams and to direct the CPU to move information between the IOUs and buffer 148 in the system memory.

Each of the multimedia data streams may include multiple elementary streams each for a different respective video program. The number of program streams supported by system 140 is ultimately limited by the bandwidth of the system bus 142 and the maximum waiting time required to access file sections on disk drives 147. The maximum waiting time before access to files on the hard drives in the invention is reduced by the shuffling process of the invention in which sections of files are striped across zones of the disk drives as described above.

Figure 6:
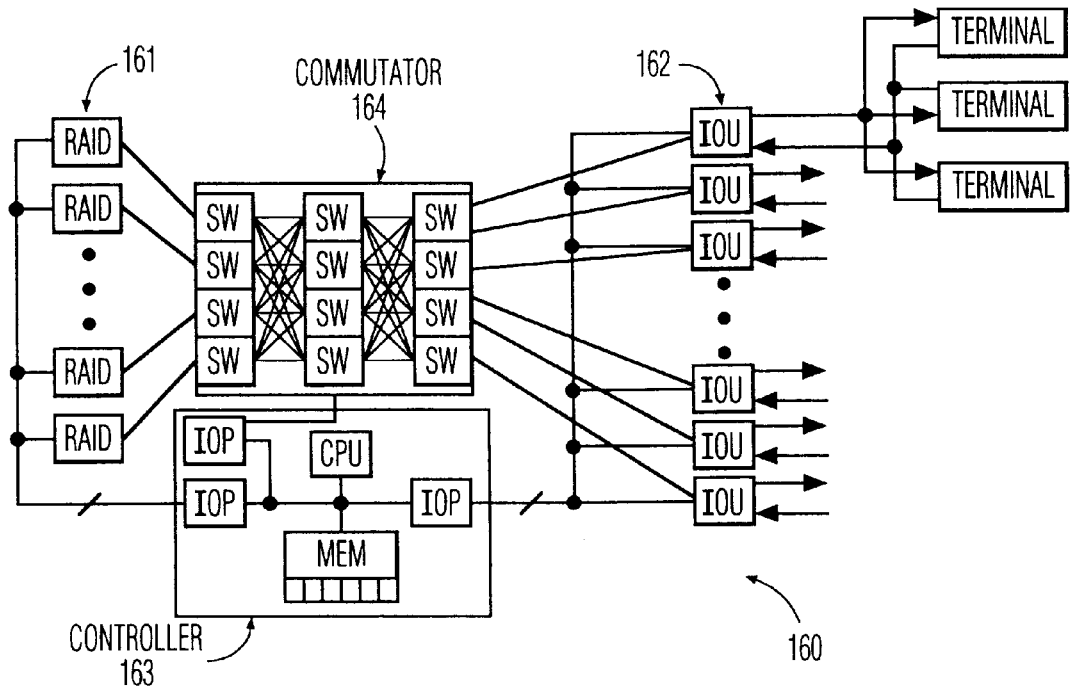
FIG. 6 illustrates another embodiment of a video server for implementing the invention.

FIG. 6 illustrates a multimedia distribution system 160 of the invention. The system supports a large number of simultaneous multimedia data streams for recording and/or playing video programs. Files are stored striped across a large number of RAID systems 161. That is, an approximately equal portion of each multimedia data file is stored in each of the RAID systems. Each RAID system includes one or more disk controllers (not shown) and a multitude of disk drives (not shown). An approximately equal part of the portion of a file contained in a RAID system, is stored in each drive of that RAID system. Input output units 162 (IOUs) each provide simultaneous recording and playing of multimedia data streams for multiple video programs. A controller 163 regulates the switching of a commutator 164 which allows each IOU to access each RAID system.

The commutator is a routing switcher capable of switching at least approximately simultaneously all the outputs with respect to the inputs. It operates to connect each of the active IOUs with each of the RAID systems one-at-a-time in a round robin manner for short periods of time. For example, if there are an equal number of IOUs and RAID systems, then each of the IOUs can be constantly connected to one of the RAID systems, and all of the connections will be regularly switched so that which RAID system is connected to a particular IOU will regularly change and each of the IOUs will be connected to each of the RAID systems in turn over a relatively short period of time. More complex switching schemes can be implemented when there are a different number of active IOUs and RAID systems or when some IOUs require more access time than other IOUs.

The number of IOU's and RAID systems is only limited by the number of paths provided through the commutator, and the number of programs that can be simultaneously accessed by the IOUs is limited by the number of RAID systems (up to the number of IOUs), the waiting time for accessing data in the RAID systems, and the access bandwidth of the IOU's and RAID systems. Again, the waiting time before access to files on the hard drives in the invention, is reduced by the shuffling process of the invention in which sections of files are striped across zones of the disk drives as described above.

Figure 7:
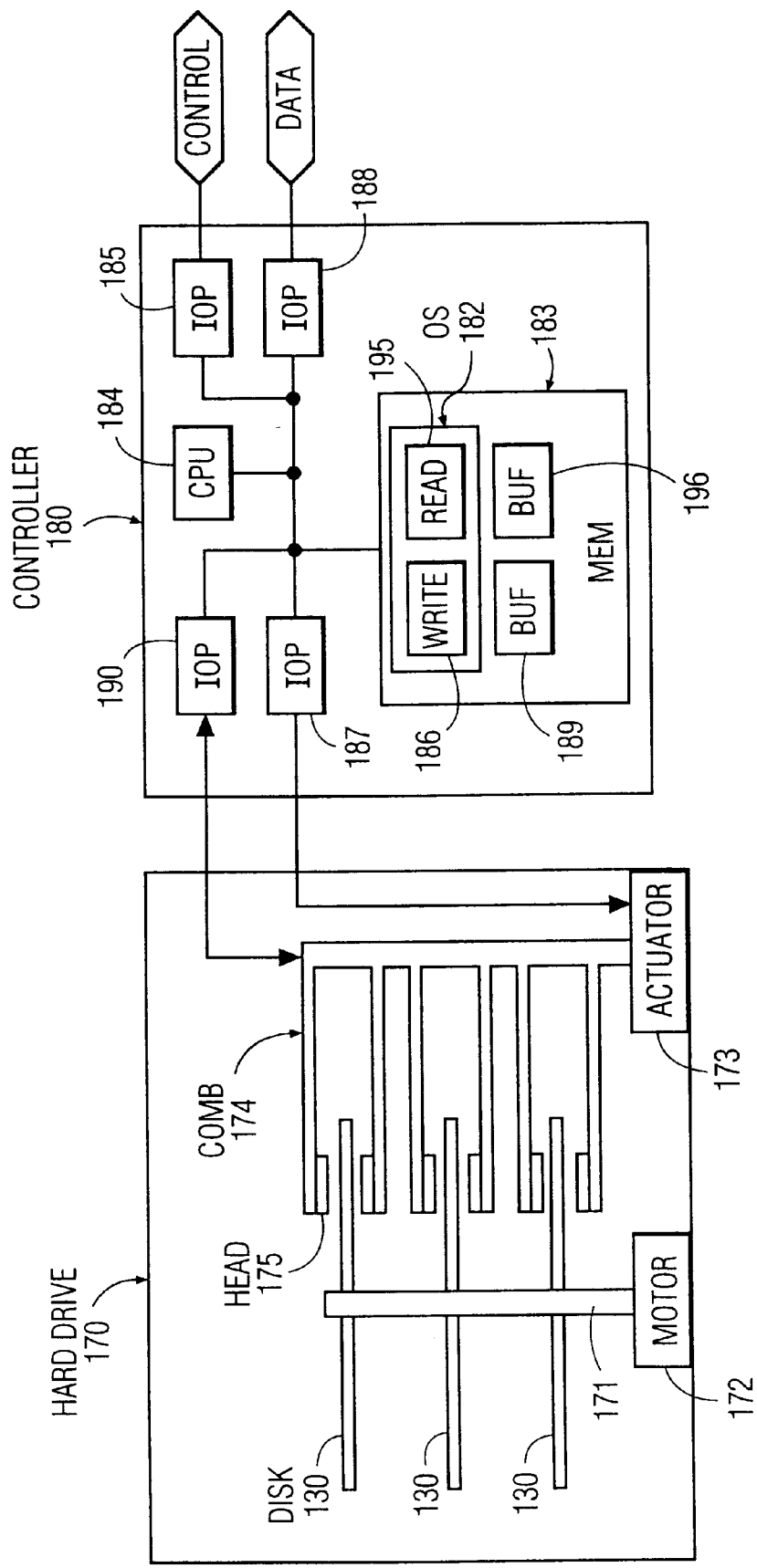
FIG. 7 schematically illustrates another embodiment of the invention.

FIG. 7 schematically illustrates another embodiment of the invention. A hard drive 170 includes multiple disks 130 which are divided into zones described above in detail in relation to FIG. 4. The disks are mounted on an axel 171 and spun by motor 172. An actuator 173 rotates a comb 174 to move a head 175 with a component of movement which is in the radial direction with respect to disks 130. In controller 180, an operating system (OS) software module 182 in memory 183 controls a central processing unit (CPU) 184 and an input and output processor (IOP) 185 to receive control signals.

In response to a command signal to write data for a file, write module 186 of the OS directs IOP 187 and the CPU to command the actuator to move the heads over respective tracks of a cylinder of a first write zone of the disks. At the same time the write module directs the CPU and IOP 188 to begin receiving the data for the file and store it in buffer 189. When the heads have been moved into position over the correct tracks, then the write module directs the CPU and IOP 190 to write file data from buffer 189 into the tracks of the cylinder. When that cylinder is filled then the write module directs the CPU and IOP 187 to seek to another empty cylinder in a different write zone depending on a predetermined order of zones for accessing data in the zones. Again, when head 175 has been moved into position to write into the subsequent cylinder, then the write module directs the CPU and IOP 190 to write file data from buffer 189 into each of the tracks of the subsequent cylinder.

In a similar manner, in response to a command signal to read data for a file, read module 195 of the OS directs IOP 187 and the CPU to command the actuator to move the heads over respective tracks of a first reading zone of the disks. When the heads have been moved into position over the correct tracks, then the read module directs the CPU and IOP 190 to read file data from each of the tracks of the cylinder into buffer 196. At the same time the read module directs the CPU and IOP 188 to begin transmitting the data for the file from buffer 196. When that first cylinder has been read then the read module directs the CPU and IOP 187 to seek to the next cylinder for the file which will be located in a different zone depending on a predetermined order of zones for accessing data. Again, when head 175 has been moved into position over the subsequent cylinder, then the read module directs the CPU and IOP 190 to read file data from each of the tracks of the subsequent cylinder into buffer 196.

In case the controller has received multiple commands to access data for different respective files, then the controller takes turns accessing the data for each file in a round robin manner.

The invention has been described with reference to specific embodiments including the best mode for carrying out the invention, and with sufficient detail that those skilled in the art can make and use the invention. Those skilled in the art may modify these embodiments or provide other embodiments within the spirit of the invention, and thus, the description does not limit the present invention to the disclosed embodiments. The invention is limited only by the following appended claims.

I claim:

1. An information storage and retrieval system for simultaneous sequential access to multiple files, comprising:

an information carrier means for positioning an information carrier;

means for writing a multitude of sequentially accessible files onto the information carrier with sequential portions of the files striped across a plurality of three or more zones of the carrier so that files are approximately evenly spread across the plurality of zones and the zones each contain multiple portions of each of the files; and means for reading the information carrier after a seek time that depends on the position of a movable reading portion of the reading means prior to reading and the position of the reading portion when reading begins, wherein when sequentially reading the files, portions of the files are read out of sequential order into a buffer and then transmitted from the buffer in sequential order so as to further reduce waiting time before reading files.

2. The system of claim 1 in which:

the carrier is disk-shaped with one or more spiral tracks or multiple circular tracks and a head moves radially with respect to the carrier for reading different circular tracks or different portions of a spiral track;

the zones are each separate and independent from the other zones;

each zone has approximately equal information storage capacity;

the number of zones is selected to reduce the maximum average seek time when simultaneously reading any combination of a plurality of the files;

there are at least 4 predetermined zones;

the movable portion of the reading means moves with a component of the movement in a radial direction across the disk-shaped carrier and the zones are ring-shaped and defined by circumferential boundaries;

there are multiple sections of multiple files in each zone; multiple files are striped across all the zones in a same predetermined zone order; and the system is a video server and the files contain video information.

* * * * *